United States Patent [19]

Sahar

[11] 4,363,513
[45] Dec. 14, 1982

[54] AUTOMOBILE PROTECTING SUN SHADE

[76] Inventor: Raphael Sahar, 39 Ahuzath Kinnereth, Tiberias, Israel

[21] Appl. No.: 81,130

[22] Filed: Oct. 2, 1979

[51] Int. Cl.³ .............................................. B60J 3/02
[52] U.S. Cl. ............................ 296/140; 160/DIG. 3; 296/97 J
[58] Field of Search ..................... 296/98, 95 R, 95 C, 296/97 G, 97 J, 97 R, 138, 140, 141, 143; 160/368 S, DIG. 2, DIG. 3

[56] References Cited

U.S. PATENT DOCUMENTS

| | | | |
|---|---|---|---|
| 1,744,136 | 1/1930 | Moorhouse | 296/143 |
| 1,771,322 | 7/1930 | Tassell | 296/140 |
| 1,878,943 | 9/1932 | Locke et al. | 296/98 |
| 2,258,971 | 10/1941 | Carlson | 296/140 |
| 2,559,471 | 7/1951 | Schrock | 296/97 G |

FOREIGN PATENT DOCUMENTS

| | | | |
|---|---|---|---|
| 2258005 | 5/1974 | Fed. Rep. of Germany | 296/97 G |
| 366539 | 2/1932 | United Kingdom | 296/98 |

*Primary Examiner*—Joseph F. Peters, Jr.
*Assistant Examiner*—Ross Weaver
*Attorney, Agent, or Firm*—Browdy and Neimark

[57] ABSTRACT

In automobiles an arrangement for protecting the interior of the passenger compartment from becoming overheated by sun irradiation and for securing privacy of persons in the car comprises curtains adapted to be drawn over all windows of the car. The curtains are stored—when not in use—within a casing below the roof of the car and are guided in rails extending from that casing downwardly. The curtains are drawn by means of a mechanism driven by an electrical motor.

8 Claims, 5 Drawing Figures

U.S. Patent  Dec. 14, 1982  Sheet 1 of 2  4,363,513

AUTOMOBILE PROTECTING SUN SHADE

BACKGROUND OF INVENTION

The present invention concerns motor cars and more particularly it relates to an arrangement for protecting automobiles for conveyance of passengers against overheating of the interior thereof by the sun and also to provide privacy wherever that is required.

It is a well known and frequently experienced nuisance that a car which had been parked during the hours of daylight—even for an hour or two only—at a place where no shade is available, becomes very hot inside so that sometimes it is almost impossible for the driver and passenger to enter the car. The heat sometimes reaches a degree which makes it impossible to touch the steering wheel and metal parts within the car. This is due to sun irradiation, the sun rays penetrating through the windows of the car. Since cars intended for conveyance of passengers have glazed practically the upper half of the car body and since parked cars have to have the windows closed (in view of possible theft of articles in the car or unauthorized entry), means have to be found to protect the interior of the car against becoming hot inside the passenger compartment.

STATE OF ART

It is known to provide textile or plastic covers or shrouds which are placed on a car when the latter is left in a parking lot or the street. However it is not practical—being time consuming and a continuous operation—to cover the car whenever parked in the street or a parking lot for an hour or two.

OBJECT OF THE INVENTION

It is therefore the object of the present invention to provide means which can afford the coveted protection of the car's interior and may also serve to ensure privacy to the passengers in the car.

SHORT SUMMARY OF DISCLOSURE

According to the invention there is provided an installation comprising a casing affixed to the inside of the car's roof, such casing containing four curtains,—one for the windshield, two oppositely disposed ones for the sides of the car, and one for the rear window, the said curtains being provided with guiding members at their lateral edges which are guided in rails extending within the car, along or in the four columns supporting the roof of the car, pull-ropes being attached to the said curtains for moving them into or out of the said casing, drive means being provided for drawing the curtains, such drive being operable from within the car.

SHORT DESCRIPTION OF DRAWINGS

The invention will now be described with reference to the accompanying drawings. In the drawings:

FIG. 1 illustrates the general outlay and location of the new arrangement in a passenger car.

FIG'S. 2 and 3 show schematically the arrangement of a curtain on a car window, in two different positions.

FIG'S. 4 and 5 illustrate schematically the mechanism by means of which curtains can be operated, FIG. 5 being a view on line V—V of FIG. 4.

DESCRIPTION OF PREFERRED EMBODIMENT

The conventional passenger car is fitted with a boxlike container underneath the roof of the car. Into this container the curtains can be withdrawn. The whole mechanism is housed in a box B from which extend rails R running down the four columns of the car body.

Figure 1:
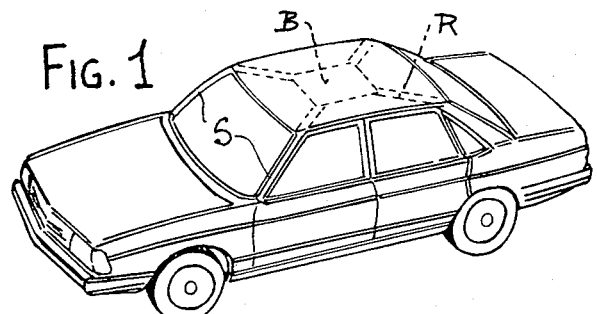
Figure 2:
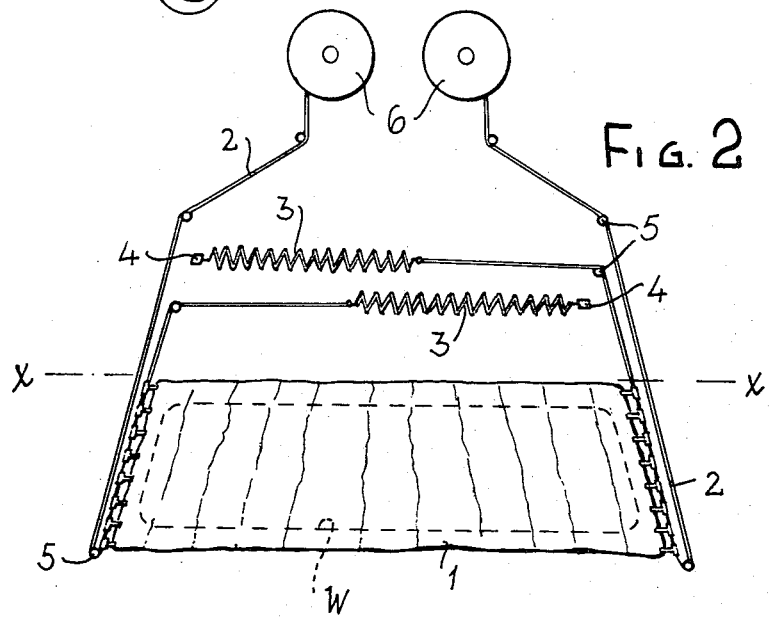

In the position shown in FIG. 2 the curtain 1 is fully drawn i.e. it covers a window of the car. In that position spiral springs 3 which connect the curtain 1—via pull-ropes 2 with a fixed point 4—are fully expanded. As can be seen, the ropes 2 are led around a number of idle pulleys 5, to be connected at their ends to pulleys 6. The operation and function of these latter will become clear from the following description.

Figure 3:
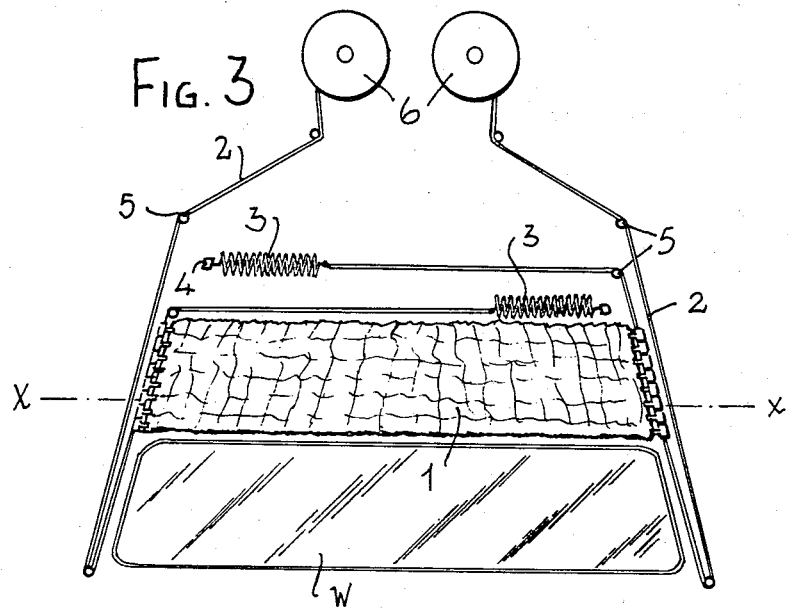

In FIG. 3 the curtain has been withdrawn and the springs 3 have contracted, thereby pulling the curtain into the said withdrawn position i.e. into the container beneath the roof of the car.

It should be mentioned here that both FIGS. 2 and 3 are schemes projected into a plane, while in actual condition of use, the line x—x in the two figures indicates an axis dividing the two planes in which the parts shown in FIGS. 2 and 3 actually extend defining an obtuse angle between them.

Figure 4:
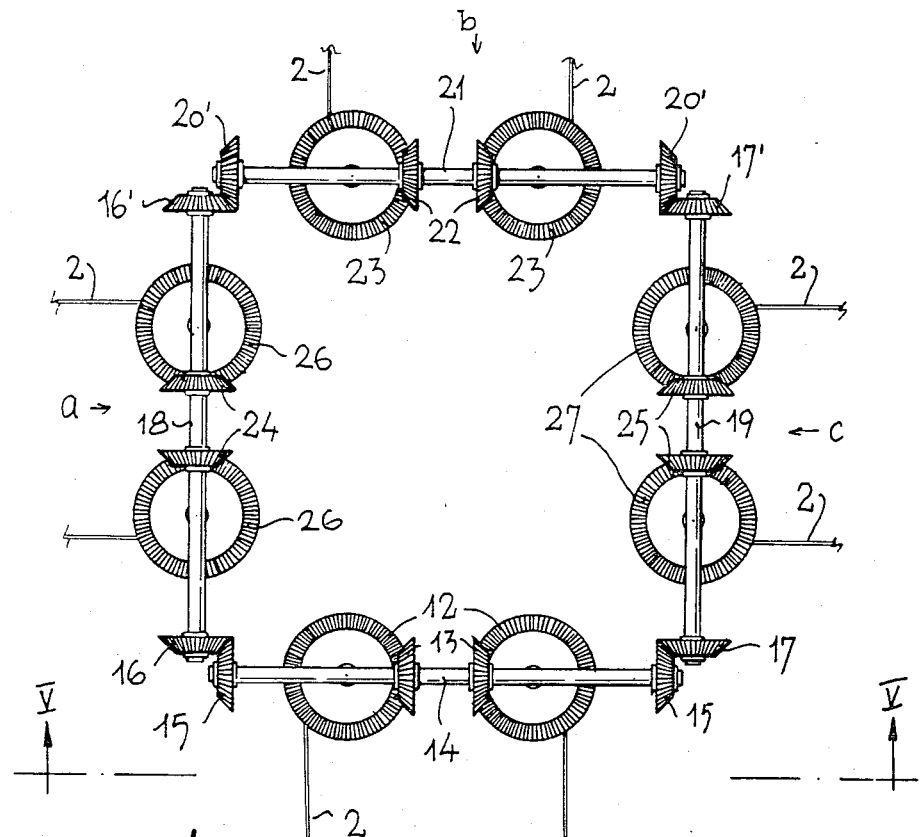

The scheme of FIG. 4 is also a projection into a single plane.

The drive for the whole mechanism is afforded by an electrical motor M conveniently placed in the luggage compartment of the car and supplied with current from the car battery in a conventional way. Driven by the motor M are two pulleys 10 which revolve in opposite directions of one another. Onto pulleys 10 wind pull ropes 2 which are led around idle pulleys 5. These ropes wind on pulley 11 which is concentrical with and fixedly attached to crown wheels 12.

Crown wheels 12 mesh with pinions 13, keyed on a shaft 14. To both ends of shaft 14 are keyed pinions 15 which mesh with further pinions 16 and 17 (the axes of pinions 15 and those of pinions 16, 17 being normal to one another). From pinions 16 and 17 respectively extend shafts 18, 19 which, at their ends, carry pinions 16' 17' meshing with pinions 20 at the ends of shaft 21 which in the same way as shaft 14 carries intermediate pinions 22 meshing with respective crown wheels 23. Both shafts 18, 19 also carry keyed to them, at their middle portions pinions 24, 25 meshing with respective crown wheels 26, 27.

Thus there is formed a system of four shafts arranged in a square, all of which are meshingly interconnected.

To each crown wheel 23, 26, 27 is fixedly attached a pulley as described in relation to crown wheels 12.

Figure 5:
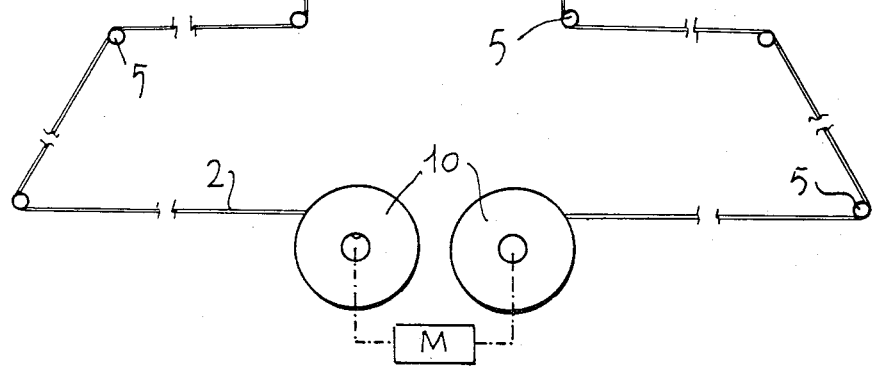
Figure 5:
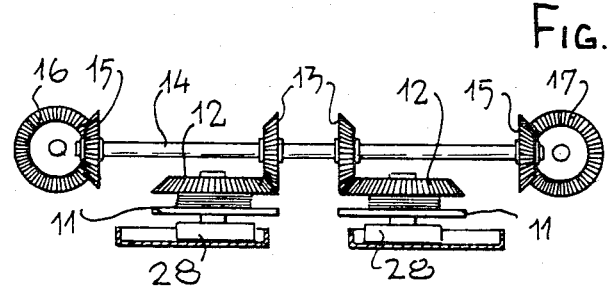

Turning now to FIG. 5, each unit comprising a crown wheel and a pulley connected therewith can be moved laterally by means of an electromagnet or solenoid 28. So, e.g. the crown wheel 12 normally meshing with pinion 13 can be made to unmesh interrupting drive to the respective pulley. The same applies to assemblies of crown wheel and pulley for the front and side windows. The purpose of this arrangement will become clear from the following description of operation.

The new arrangement functions as follows: when the drive is switched on pulleys 10 rotate and pull ropes 2 unwound from pulleys 11, causing crown wheels 12 to rotate and to transmit the drive to pinion 13, which in turn transmits the drive to the remaining three shafts 18, 19, 21.

Thereby the crown wheels 23, 26, 27, are rotated and together with them the respective pulleys (not seen in the drawing). Due to this, rope 2 at the three sides a, b, c, of the car draws the curtains down. Simultaneously therewith the respective spiral springs 3 are expanded. Proper stops are provided holding the curtains in this position. When it is desired to withdraw the curtains, the stop is released and the springs raise the curtains. Pulleys 11 now wind on the respective ropes 2.

Thus the arrangement functions simultaneously on all four sides of the car. In case that only one or two or three sides should be curtained, the above described arrangement shown in FIG. 5 is actuated, cutting out—at will—one or more curtain mechanisms.

It should be mentioned that instead of springs 3, the pulleys may be provided with a conventional other return mechanism, as is known with window blinds. In fact, such a known mechanism will have to be employed for the rear window curtain. This mechanism will have to act on pulleys which are connected to crown wheels 12.

I claim:

1. In an automobile—an installation which comprises a casing affixed to the car's roof at its inside,
    four curtains to be contained in such casing, one for the windshield, two oppositely disposed ones for the sides of the car, and one for the rear window,
    the said curtains being provided with guiding members for their lateral edges,
    which guiding means travel in rails extending within the car along members supporting the roof of the car,
    pull ropes being attached to said curtains for moving them relative to the said casing, said pull-ropes being connected to springs at one end thereof, and
    drive means connected to the other end of each said pull-rope and being provided for moving the curtains, which drive means are operable from the interior of the car,
    said drive means including electrical motor means to simultaneously drive a plurality of said curtains, and means to selectively disconnect said drive means for one or more of said plurality of curtains, so that said electric motor acts on a lesser number of said curtains.

2. The arrangement of claim 1, characterized thereby that the said casing is a flat, box-like structure.

3. The arrangement of claim 2, characterized thereby that the said rails extend along from columns supporting the roof of the car.

4. The arrangement of claim 1, wherein said springs are spiral springs for pulling the curtains into the casing.

5. The arrangement of claim 1, characterized thereby that the motor is housed in the luggage compartment of the car.

6. In an automobile—an installation which comprises a casing affixed to the car's roof at its inside,
    four curtains to be contained in such casing, one for the windshield, two oppositely disposed ones for the sides of the car, and one for the rear window,
    the said curtains being provided with guiding members at their lateral edges,
    which guiding means travel in rails extending within the car along members supporting the roof of the car,
    pull-ropes being attached to the said curtains for moving them relative to the said casing, and
    drive means being provided for moving the curtains, which drive means are operable from the interior of the car,
    wherein the drive for the movements of the curtain comprises a motor fed with electrical current from the battery of the car, two first pulleys revolving in opposite directions being driven by the motor, pull-ropes winding on the said two pulleys, said ropes leading to a second pair of pulleys fixedly attached to a first pair of crown wheels, each of which meshes with one of a first pair of pinions which latter, over a common shaft, transmit rotational movement to a second pair of pinions, which—in turn—mesh with a third pair of pinions and transmit rotational movement to a fourth pair of pinions, each of which via second and third common shafts and a fifth and sixth pair of pinions transmit movement to third and fourth pairs of crown wheels which are fixedly connected each with a reel from which pull-ropes extend to side curtains, said second and third shafts carrying seventh and eighth pinions transmitting rotational movement to a fourth shaft and a pair of ninth and tenth pinions meshing with fifth and sixth crown wheels, each of which is associated with a reel from which pull-ropes extend to the frontal curtain of the arrangement.

7. The arrangement of claim 1, wherein said guiding means comprises an idler pulley located adjacent the bottom corner of each window, and said drive means comprises a driven pulley connected to the other end of each said pull-rope, and wherein each said pull-rope passes from said driven pulley down and around said idler pulley, then back upwardly to the curtain with which it is associated and through the guiding members of said curtain, and then to a said spring which is housed in said casing.

8. An arrangement in accordance with claim 1, wherein said selective means comprises a plurality of interacting gear wheels forming part of said drive means, and electromagnetic means for selectively moving one or more of said gear wheels out of engagement with another gear wheel.

* * * * *